(12) United States Patent
Komatsubara et al.

(10) Patent No.: US 9,656,582 B2
(45) Date of Patent: May 23, 2017

(54) HEADREST FOR VEHICLE SEATS AND METHOD OF MANUFACTURING HEADREST

(75) Inventors: Takao Komatsubara, Kurashiki (JP); Naoki Sakane, Kurashiki (JP); Kouji Makino, Kurashiki (JP)

(73) Assignee: NAMBA PRESS WORKS CO., LTD, Okayama (JP)

( * ) Notice: Subject to any disclaimer, the term of this patent is extended or adjusted under 35 U.S.C. 154(b) by 183 days.

(21) Appl. No.: 14/368,644

(22) PCT Filed: Apr. 11, 2012

(86) PCT No.: PCT/JP2012/059846
§ 371 (c)(1),
(2), (4) Date: Jun. 25, 2014

(87) PCT Pub. No.: WO2013/099308
PCT Pub. Date: Jul. 4, 2013

(65) Prior Publication Data
US 2014/0327287 A1    Nov. 6, 2014

(30) Foreign Application Priority Data
Dec. 26, 2011    (JP) ................................ 2011-284333

(51) Int. Cl.
*B60N 2/48* (2006.01)
*B60N 2/58* (2006.01)
(Continued)

(52) U.S. Cl.
CPC ............ *B60N 2/4885* (2013.01); *B29C 44/12* (2013.01); *B29C 44/1228* (2013.01);
(Continued)

(58) Field of Classification Search
CPC .. B60N 2/4885; B60N 2/4228; B60N 2/4249; B60N 2/4808; B60N 2/5816;
(Continued)

(56) References Cited

U.S. PATENT DOCUMENTS 5,820,222 A * 10/1998 De Filippo .......... B60N 2/5841
297/220
6,149,233 A * 11/2000 Takei ................... B60N 2/4847
297/220 X (Continued)

FOREIGN PATENT DOCUMENTS

| JP | A 6-179223 A | 6/1994 |
| JP | 08-252147 | 10/1996 |

(Continued)

*Primary Examiner* — Anthony D Barfield
(74) *Attorney, Agent, or Firm* — Renner, Kenner; Arthur M. Reginelli (57) ABSTRACT

A headrest that facilitates the assembly of a structural member for absorbing impact, and a method for producing the same. The method for manufacturing the headrest having surface material, headrest stay, seal sealing an opening at the bottom of headrest, plate-like impact-absorbing member, one end of which is connected to seal, and foamed body in headrest includes a step of inserting headrest stay in insertion holes of seal and assembling it, a step of inserting headrest stay and impact-absorbing member through the opening, a step of inserting a circumferential portion of the opening of surface material into seal, a step of injecting a foaming material through injection hole of seal and foaming it, and a step of forming a foamed body by curing the injected foaming material. The opening is sealed when the foaming material impregnates and cures at the circumferential portion of the opening.

7 Claims, 7 Drawing Sheets

(51) Int. Cl.
  *B60N 2/70* (2006.01)
  *B29C 44/12* (2006.01)
  *B60N 2/42* (2006.01)
  *B29C 44/14* (2006.01)
  *B29C 44/34* (2006.01)
  *B29L 31/30* (2006.01)

(52) U.S. Cl.
  CPC .......... *B29C 44/1271* (2013.01); *B29C 44/14* (2013.01); *B29C 44/351* (2013.01); *B60N 2/4228* (2013.01); *B60N 2/4249* (2013.01); *B60N 2/4808* (2013.01); *B60N 2/5816* (2013.01); *B60N 2/7017* (2013.01); *B29L 2031/3023* (2013.01)

(58) Field of Classification Search
  CPC ..... B60N 2/7017; B29C 44/12; B29C 44/351; B29C 44/1228; B29C 44/14; B29C 44/1271
  USPC .................................. 297/216.12, 220, 391
  See application file for complete search history.

(56) References Cited

U.S. PATENT DOCUMENTS

| | | | |
|---|---|---|---|
| 6,527,344 B2* | 3/2003 | Takei | B60N 2/58 297/220 |
| 7,066,544 B2* | 6/2006 | Tseng | B60N 2/4808 297/216.12 |
| 7,537,282 B2* | 5/2009 | Veine | B60N 2/4885 297/216.12 X |
| 2010/0078972 A1 | 4/2010 | Sayama | |

FOREIGN PATENT DOCUMENTS

| | | |
|---|---|---|
| JP | 11-348631 | 12/1999 |
| JP | 2007-151975 | 6/2007 |
| JP | 2010-105655 | 5/2010 |

\* cited by examiner

HEADREST FOR VEHICLE SEATS AND METHOD OF MANUFACTURING HEADREST

This application is a national-stage application of International Application Serial No. PCT/JP2012/59846, Filed Apr. 11, 2012, which claims priority to Japanese Patent Application Serial No. 2011-284333, filed on Dec. 26, 2011, which are incorporated herein by reference.

TECHNICAL FIELD

The present invention relates to a headrest for vehicle seats and a method of manufacturing the headrest whereby an impact-absorbing member absorbs the impact to the head and neck of the occupant at the time of a rear collision.

BACKGROUND ART

The headrest is fitted to the upper part of the seat back of the vehicle seat and is formed with a surface material, a headrest stay and a foamed body. The surface material forms the outer contour, the headrest stay is the skeleton member, and the foamed body is filled and foamed in the headrest. Recently, headrests including impact-absorbing members have been developed. (See, for example, patent document 1 below.) The impact-absorbing member reduces the impact to the head and neck of the occupant at the time of a rear collision, and it supports the head more stably.

The surface material of the headrest has an opening. In the production of the headrest, the absorbing member is mounted on the headrest stay, and then it is inserted into the surface material through the opening. The opening is made large to facilitate insertion. Because of the large opening, there may be leakage of the foaming material from the opening at the time of foaming, and the appearance of the headrest may be impaired.

It is possible to sew the opening to prevent leakage of the foaming material. But local tensile force acts on the surface material around the opening at the time of foaming, and in the process of forming the foamed body by the reaction of the foaming material injected into the surface material, the surface material is not uniformly expanded, and wrinkles form on the part where the local tensile force acts. As a result, the appearance of the headrest is impaired.

In view of those problems, in the headrest disclosed in patent document 1, the size of the opening of the surface material is set to a minimum size, the impact-absorbing member and the headrest stay are each separately inserted into the headrest, and the impact-absorbing member and the headrest stay are assembled in the headrest. An inclined guide surface and an engagement part for the headrest stay are fitted to the impact-absorbing member in order to facilitate assembly.

CITATION LIST

Patent Literature

Patent Literature 1: Japanese Patent Application Laid-open Publication No. 2007-151975

SUMMARY OF INVENTION

Problems to be Solved by the Invention

However, even though the inclined guide surface and the engagement part for the headrest stay are fitted to the impact-absorbing member, skill and labor are required for assembling them accurately in the surface material. Furthermore, a complex structure is necessary, such as in fitting the inclined guide surface to a structural member for absorbing impact, and consequently the cost is increased.

The purpose of the present invention is to provide a headrest that facilitates the assembly of a structural member for absorbing impact, and a method for producing the same.

Solution to Problem

For achieving the above-described purpose, this invention provides a method of manufacturing a headrest for vehicle seats that has a surface material forming the outer contour, a headrest stay inserted in the headrest, a seal sealing the opening formed at the bottom of the surface material of the headrest, a plate-like impact-absorbing member one end of which is connected to the seal and fitted in the headrest, and a foamed body formed in the headrest, and the method consists of the following steps: inserting a pair of legs of the headrest stay through an insertion hole provided at the seal and assembling them at a predetermined position; inserting the assembled headrest stay and the impact-absorbing member into the surface material through the opening of the surface material; inserting the circumferential portion of the opening into the seal; injecting a foaming material to form the foamed body into the surface material through an injection hole provided at the seal and foaming it; and forming the foamed body by curing the foaming material injected into the surface material; and the circumferential portion of the opening of the surface material that was inserted into the seal is mounted at the seal and the opening is sealed when the foaming material impregnates and cures at the circumferential portion of the opening of the surface material.

Thus, because the impact-absorbing member is connected to the seal and also the legs of the headrest stay are inserted through the insertion hole of the seal, those parts can be inserted into the surface material through the opening of the surface material in the assembled state. Furthermore, because the circumferential portion is inserted into the seal, leakage of the injected foaming material from the opening is prevented. The circumferential portion of the opening of the surface material is mounted at the seal by the foaming material's curing after foaming, and the opening is sealed. Therefore, the headrest can be manufactured without impairing the appearance of the surface material.

The impact-absorbing member comprises a facing surface and a back surface. The facing surface faces the head of the occupant sitting in the vehicle seat. The back surface is the opposite side of the facing surface. One end of the back surface is connected to the seal. By this structure, the facing surface reduces the impact to the head and neck of the occupant, and the impact force is input to the headrest stay from the seal at the bottom of the headrest, so the impact force is applied to a lower part of the headrest stay. Therefore, the momentum is reduced and the amount of deformation of the headrest stay is reduced. This reduction of the amount of deformation of the headrest stay can minimize deformation of the occupant's cervical vertebrae, which can cause whiplash.

Also, the other end of the back surface, which is opposite one end of the impact-absorbing member, comes into contact with the headrest stay. By this structure, the impact force applied to the impact-absorbing member is dispersed to the headrest stay. Consequently, the amount of deformation of the headrest stay can be further reduced.

In addition, the facing surface is formed in a curved shape adapted to the shape of the head and neck of the occupant, so the impact applied to the head and neck of the occupant can be reduced.

A claw part is provided at the other end of the back surface opposite one end of the impact-absorbing member, and the claw part is engaged with the headrest stay. By inserting the legs of the headrest stay through the insertion hole provided at the seal, the headrest stay is engaged with the claw part. Thus, the impact-absorbing member, the seal, and the headrest stay are easily assembled at a predetermined position and can be easily inserted into the surface material through the opening.

Also, the impact-absorbing member has a part that comes into contact with the pair of legs. By this part, the impact force applied to the impact-absorbing member can be dispersed to each part of the headrest stay, and the amount of deformation of the headrest stay can be further reduced.

In addition, the seal comprises a pair of plate members, an insertion part and an injection part. The plate members are joined together with a prescribed gap around them. The insertion part has an insertion hole provided in the plate members. The injection part has an injection hole. A window part communicating with the gap is formed at one of the pair of plate members, and the circumferential portion of the opening of the surface material is inserted into the seal by being inserted into the gap. Thus, leakage of the injected foaming material from the opening is prevented. Because the tensile force does not work on the opening of the surface material at the time of the foaming of the foaming material, wrinkling is prevented even if the surface material is expanded by the foaming.

Furthermore, this invention provides a headrest for vehicle seats that comprises a surface material forming an outer contour; a headrest stay inserted into the headrest; a seal sealing the opening formed at a bottom of the surface material of the headrest; a plate-like impact-absorbing member one end of which is connected to the seal and which is provided in the headrest; and a foamed body formed in the headrest; whereby a circumferential portion of the opening of the surface material inserted into the seal is mounted at the seal and the opening is sealed when the foaming material forming the foamed body impregnates and cures at the circumferential portion of the opening of the surface material.

The impact-absorbing member comprises a facing surface and a back surface. The facing surface faces the head of the occupant sitting in the vehicle seat. The back surface is opposite the facing surface. One end of the back surface is connected to the seal.

Also, the other end of the back surface, which is opposite one end of the impact-absorbing member, comes into contact with the headrest stay.

In addition, the facing surface is formed in a curved shape adapted to the shape of the head and neck of the occupant.

Furthermore, a claw part is provided at the other end of the back surface positioned opposite one end of the impact-absorbing member, and the claw part is engaged with the headrest stay. By inserting the legs of the headrest stay into the insertion hole provided at the seal, the headrest stay is engaged with the claw part.

The impact-absorbing member has a part that comes into contact with the legs of the headrest stay.

The seal comprises a pair of plate members, an insertion part and an injection part. The plate members are joined together with a prescribed gap around them. The insertion part has an insertion hole provided in the plate members. The injection part has an injection hole. A window part communicating with the gap is formed at one of the pair of plate members, and the circumferential portion of the opening of the surface material is inserted into the gap provided between the pair of plate members.

Advantage of the Invention

According to this invention, because the impact-absorbing member is connected to the seal and also the headrest stay is inserted into the seal, those parts can be inserted into the surface material from the opening in the assembled state. Therefore, the headrest is manufactured easily, leakage of the foaming material from the opening is prevented, and the appearance of the surface material is not impaired after the headrest is manufactured.

By the impact-absorbing member, the impact to the head and neck of the occupant is reduced. The impact force is input to the headrest stay from the seal at the bottom of the headrest, and the impact force is applied to the lower part of the headrest stay. Therefore, the momentum is reduced and the amount of deformation of the headrest stay is reduced. This reduction of the amount of deformation of the headrest stay can minimize deformation of the occupant's cervical vertebrae, which can cause whiplash.

BRIEF DESCRIPTION OF DRAWINGS

FIG. 6 shows the second embodiment of the headrest according to the present invention.

BEST MODES FOR CARRYING OUT THE INVENTION

The following describes a preferred embodiment of the present invention with reference to the accompanying drawings.

(The First Embodiment)

Figure 1A:
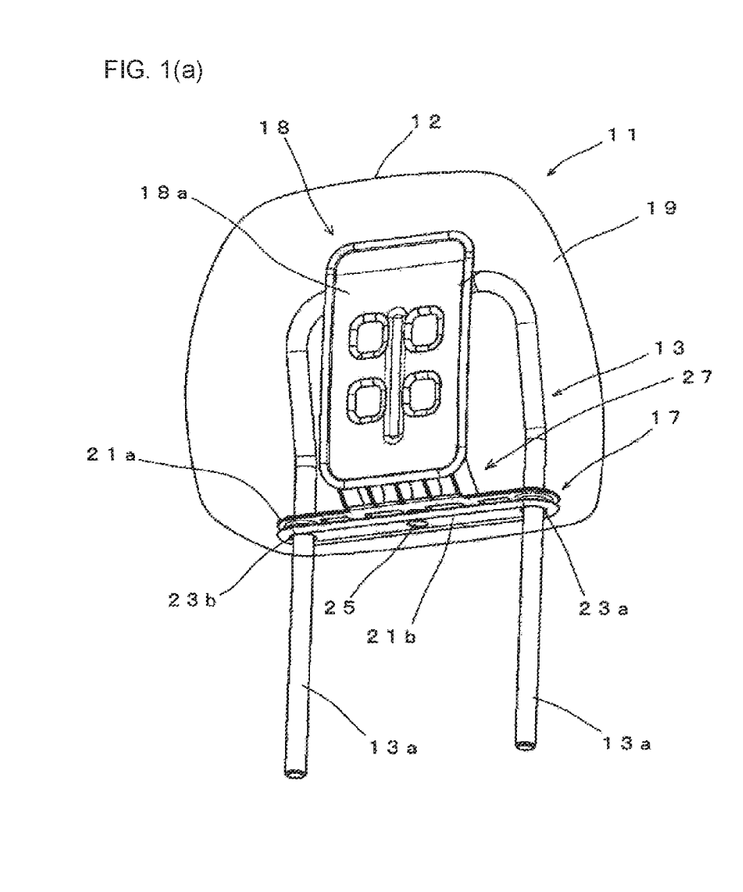
FIG. 1(a) is a front perspective view of the first embodiment of the headrest according to the present invention.
Figure 1B:
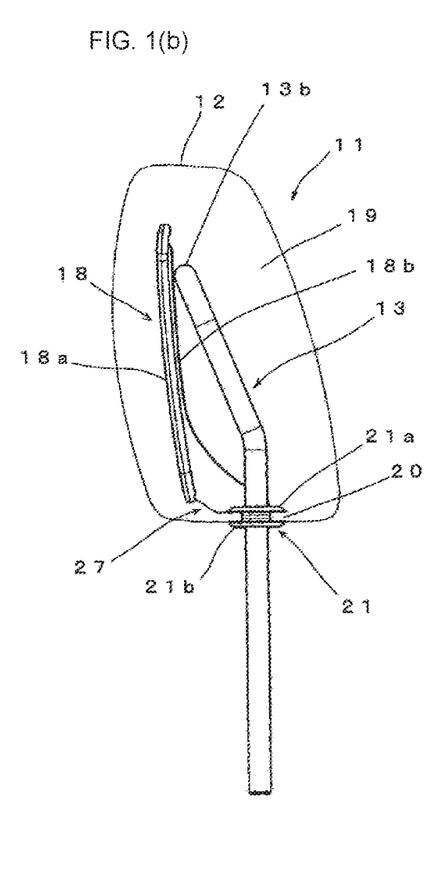
FIG. 1(b) is a longitudinal section view of the first embodiment.

A front perspective view of the first embodiment of the headrest is shown in FIG. 1(a), and a longitudinal section view is shown in FIG. 1(b).

Figure 5A:
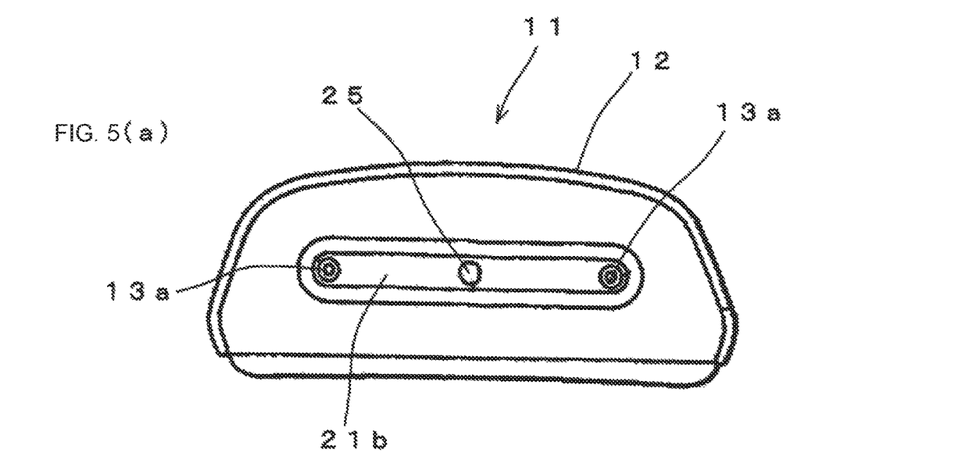
FIG. 5(a) is a bottom plan view of the first embodiment of the headrest according to the present invention.
Figure 5B:
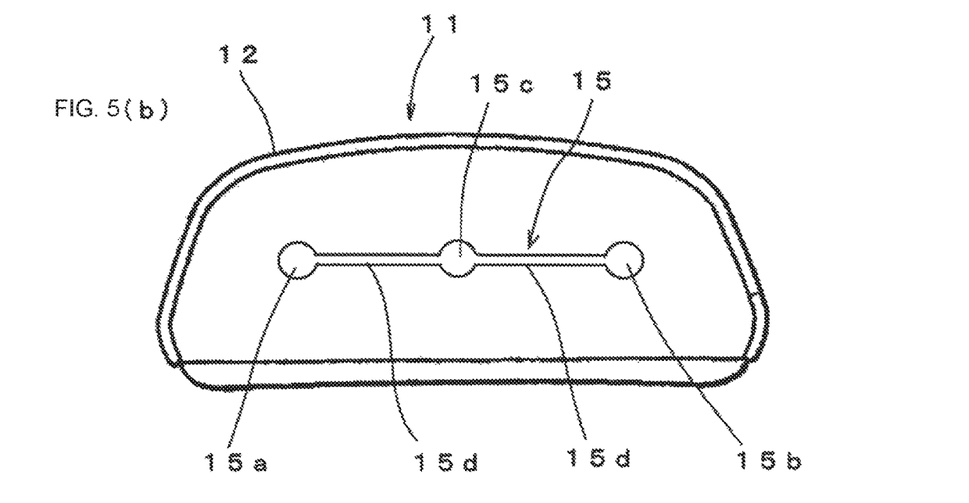
FIG. 5(b) is a bottom plan view which shows an opening formed at the bottom of the surface material of the headrest used in the first embodiment of the headrest according to the present invention.

As shown in FIG. 1(a) and FIG. 1(b), headrest 11 comprises: surface material 12 forming the outer contour of headrest 11; an inverse-U-shaped headrest stay 13 having a pair of leg parts 13a; a seal 17 sealing the opening 15 (see FIG. 5(b)) positioned at the bottom of headrest 11 and formed at surface material 12; a plate-like impact-absorbing member 18 the tip of one end of which is connected to seal 17; and a foamed body 19 formed in headrest 11.

Surface material 12 is formed by superposing a sponge-like backing material on a synthetic resin or a pile fabric, and is seamed in a desirable three-dimensional form. To hide the seam inside the surface material, the seaming is done with the surface material turned inside out. Then, the inside of surface material 12 is hidden by passing the surface material through opening 15 so that the outside of the surface material appears. Opening 15 is also used for inserting headrest stay 13 and impact-absorbing member 18 into surface material 12.

Headrest stay 13 is made of rigid metal pipe bent into an inverse-U shape when seen in front view. Headrest 13 comprises a pair of leg parts 13a and connecting part 13b. Also, leg parts 13b are bent (FIG. 1(b)) at a predetermined position toward the head of the occupant (not shown).

Seal 17 comprises inner plate 21a and outer plate 21b, which are combined with a prescribed gap 20 between them. A circumferential portion of opening 15 of surface material 12 is inserted into gap 20. At seal 17, insertion holes 23a and 23b and injection hole 25 are formed and penetrate through inner plate 21a and outer plate 21b. Leg parts 13b are inserted into insertion holes 23a and 23b. Insertion hole 25 is provided for injecting the foaming material into surface material 12.

Impact-absorbing member 18 is comprised of a square plate-like member and has facing surface 18a toward the occupant's head (not shown). Impact-absorbing member 18 also comprises back surface 18b which is the opposite surface of facing surface 18a and is in contact with headrest stay 13. Furthermore, it comprises a plurality of coupling ribs 27 connected to seal 17.

Figure 2:
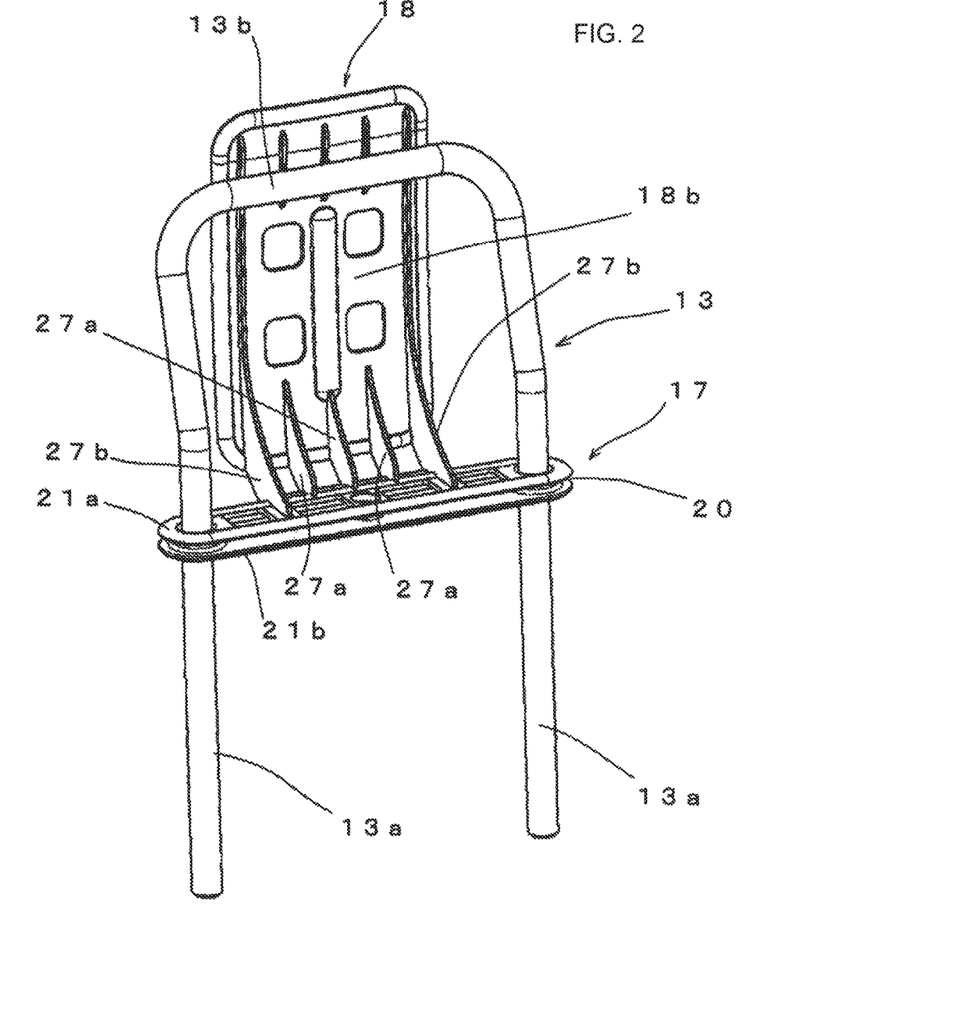
FIG. 2 is a rear perspective view of a seal with a headrest stay inserted and an impact-absorbing member of the first embodiment of the headrest according to the present invention.

As shown in FIG. 2, coupling ribs 27 combine one end of back surface 18b of impact-absorbing member 18, namely, the lower side of the back surface, with inner plate 21a of seal 17. Thus, impact-absorbing member 18 is connected to seal 17. Coupling ribs 27 are comprised of arc-shaped plate-like members. Also, coupling ribs 27 comprise three inside coupling members 27a and two relatively large side coupling members 27b. Coupling members 27a are connected to the vicinity of the center of back surface 18b of impact-absorbing member 18 and to inner plate 21a. Coupling members 27b are connected to the right and left sides of back surface 18b of impact-absorbing member 18 and to inner plate 21a. Coupling ribs 27 are integrally formed with impact-absorbing member 18 and seal 17.

As mentioned above regarding impact-absorbing member 18, the lower side of back surface 18b is connected to seal 17 by coupling ribs 27, and the upper side of back surface 18b is in contact with connecting part 13b of headrest stay 13.

Figure 3A:
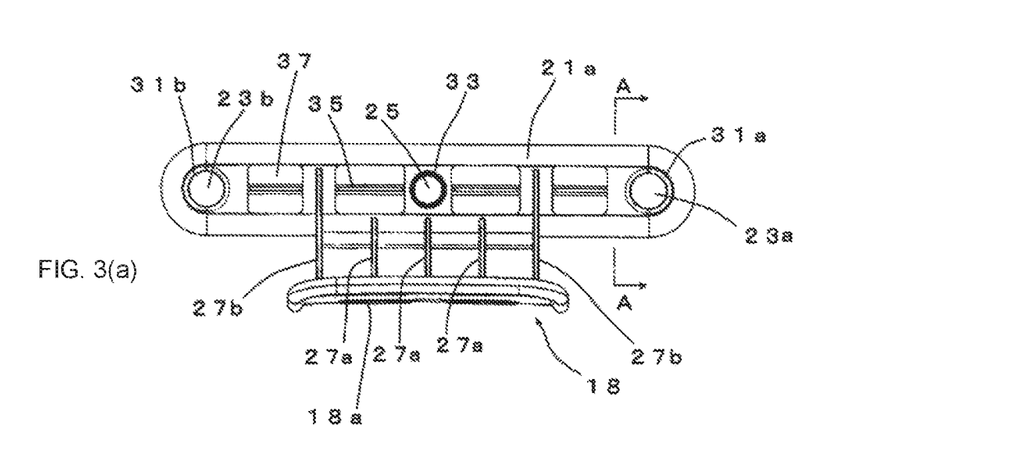
FIG. 3(a) is a plan view of the seal and impact-absorbing member of the first embodiment of the headrest according to the present invention.
Figure 3B:
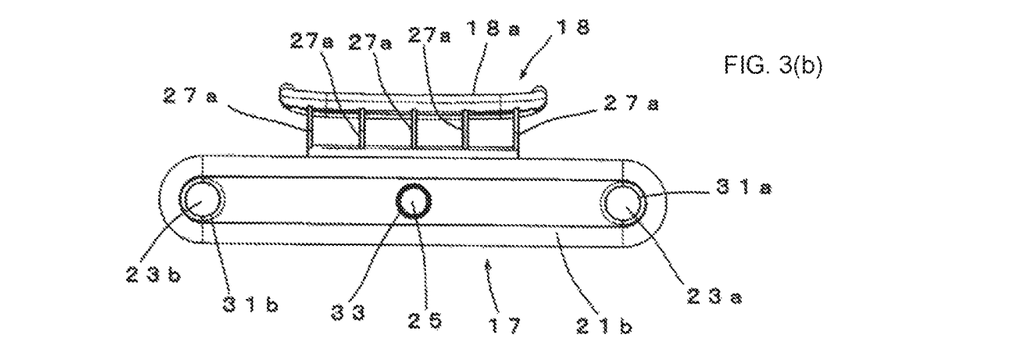
FIG. 3(b) is a bottom plan view of the first embodiment.
Figure 3C:
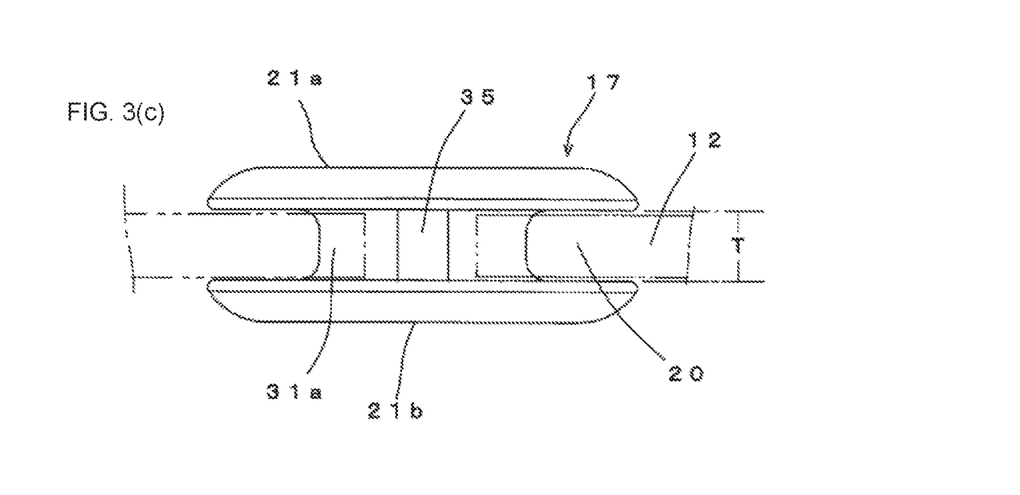
FIG. 3(c) is an A-A section view of FIG. 3(a).
Figure 4A:
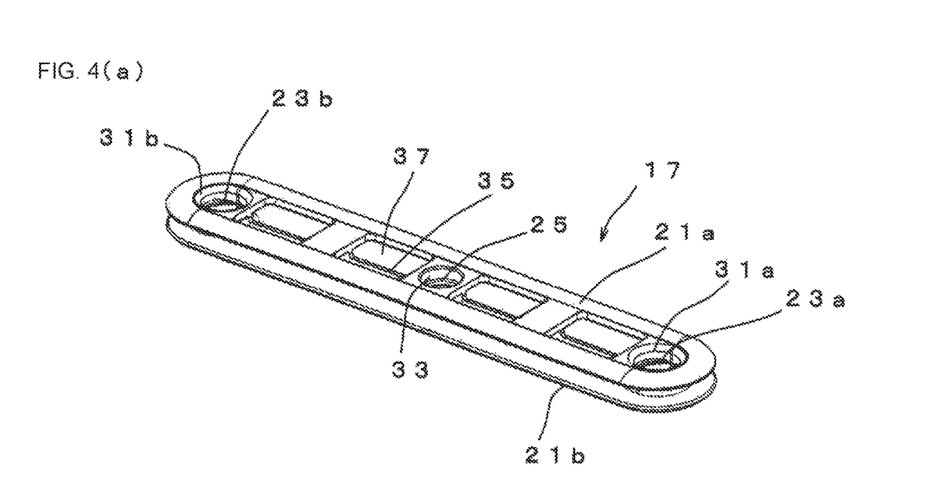
FIG. 4(a) is a perspective view of the seal of the first embodiment of the headrest according to the present invention.
Figure 4B:
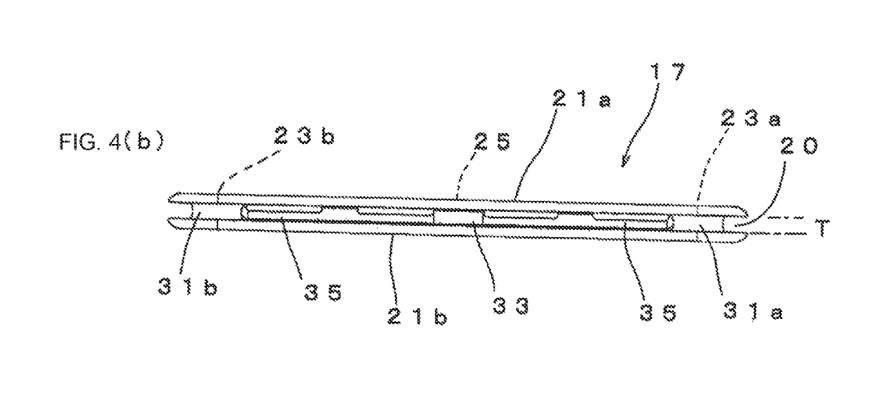
FIG. 4(b) is a front view of the seal.

The following describes seal 17 with reference to FIG. 3 and FIG. 4. Though the seal is integrally formed with impact-absorbing member 18, FIG. 4 illustrates only seal 17, for convenience of explanation.

Outer plate 21b of seal 17 is comprised of a long, thin plate-like member, and both ends of this member have a semicircular arc shape. Also, outer plate 21b comprises injection hole 25, positioned at the center, for injecting the foaming material, and insertion holes 23a and 23b, positioned at both ends of the plate, for inserting leg parts 13a of headrest stay 13 (see FIG. 1). Because outer plate 21b is exposed as part of the bottom of headrest 11, it may be treated to enhance the aesthetic appearance, such as by being colored a prescribed color.

Inner plate 21a is connected to outer plate 21b with a prescribed gap 20 around the plates. Inner plate 21a is provided inside surface material 12, and plate 21a has the same outer dimensions as plate 21b. Also, inner plate 21a is comprised of a long, thin plate-like member, and both ends of this member have a semicircular arc shape. Furthermore, inner plate 21a comprises injection hole 25, positioned at the center, for injecting the foaming material, and insertion holes 23a and 23b, positioned at both ends of the plate, for inserting leg parts 13a of headrest stay 13. The length T of prescribed gap 20 between outer plate 21b and inner plate 21a is such that a circumferential portion of opening 15 of surface material 12 can be inserted. Therefore, that length is set to be nearly the same as the thickness of surface material 12 or to be slightly less, so that surface material 12 of the circumferential portion of opening 15 can be pushed into the gap.

Outer plate 21b and inner plate 21a are coupled with each other such that insertion parts 31a and 31b comprising insertion holes 23a and 23b, injection part 33 comprising injection hole 25, and partition plate 35 are held between both plates. Insertion parts 31a and 31b and injection part 33 are comprised of cylinder-shaped members.

Partition plate 35 is comprised of a plate-like member. Partition plate 35 is provided between insertion part 31a and injection part 33, and between insertion part 31b and injection part 33. Also, partition plate 35 is provided nearly at the center along the longitudinal axis of seal 17 when seen in plane view (see FIG. 3(a)). Partition plate 35 enables the whole of circumferential portion of opening 15 of surface material 12 to be uniformly inserted into gap 20 (see FIG. 3(c)). Partition plate 35 has the height for connecting outer plate 21b and inner plate 21a except at the window parts 37 (described below), where the height is set to be lower than gap 20 (see FIG. 4(b)).

Inner plate 21a comprises four square window parts 37 along the longitudinal axis of seal 17 when seen in plane view (see FIG. 3(a)). Gap 20 is viewed through the window parts 37. As described below, injected foaming material flows into gap 20 through the window parts 37. Then, as the foaming material impregnates and cures at a circumferential portion of opening 15 of surface material 12, which is inserted in gap 20, the circumferential portion is fixed to inner plate 21a and outer plate 21b, and opening 15 is sealed by seal 17.

The bottom of headrest 11, whose opening 15 is sealed by seal 17, is shown in FIG. 5(a), and opening 15, which is formed at surface material 12 before sealing, is shown in FIG. 5(b).

As shown in FIG. 5(a), at the bottom of headrest 11, outer plate 21b of seal 17 sealing opening 15 (see FIG. 5(b)) is viewed from the outside. Injection hole 25 is formed at the center of outer plate 21b, and an injection nozzle (not shown) for the foaming material is inserted into injection hole 25. After injecting the foaming material into the surface material 12, a foamed body (not shown) is formed by foaming. At both ends of outer plate 21b, the leg parts 13a of headrest stay 13 are projected from insertion holes 23a and 23b (see FIG. 3(b)).

As shown in FIG. 5(b), opening 15 is formed at the bottom of surface material 12. Also, circular insertion openings 15a and 15b are formed at both ends of opening 15, and circular injection opening 17c is formed at the center of opening 15. Openings 15a and 15b correspond to insertion parts 31a and 31b, and opening 17c corresponds to injection part 33 of seal 17. Long hole opening 15d is formed between circular injection opening 17c and circular insertion openings 15a and 15b.

Opening 15 is so formed that headrest stay 13 inserted into seal 17 and impact-absorbing member 18 can be inserted into surface material 12, and opening 15 and seal 17 are formed at a prescribed size so as to be insertable into surface material 12.

With reference to FIG. 1 through FIG. 5, the following describes the method of producing headrest 11 of the present invention in accordance with the fabrication process.

The method of producing headrest 11 of this invention comprises a step of inserting the pair of legs 13a of headrest stay 13 through insertion holes 23a and 23b of seal 17 and assembling them at a predetermined position; a step of inserting assembled headrest stay 13 and impact-absorbing member 17 into surface material 12 from opening 15 of surface material 12; a step of inserting the circumferential portion of opening 15 into seal 17; a step of injecting the foaming material which forms foamed body 19 into surface material 12 from injection hole 25 provided at seal 17 and foaming it; and a step of forming foamed body 19 by curing the foaming material injected into surface material 12.

As shown in FIG. 2, the pair of legs 13a of headrest stay 13 is inserted through insertion holes 23a and 23b (see FIG. 3). Insertion holes 23a and 23b are formed at both ends of seal 17 where impact-absorbing member 18 is connected. Headrest stay 13 is adjusted at the predetermined position so that the upper end of back surface 18b of impact-absorbing member 18 comes into contact with connecting part 13b of headrest stay 13. Seal 17, impact-absorbing member 18 and headrest stay 13 are integrally assembled. The parts are assembled at the predetermined positions so that an impact force applied to impact-absorbing member 18 is dispersed to leg parts 13a and connecting part 13b of headrest stay 13.

Headrest stay 13 inserted into seal 17 and impact-absorbing member 18 are inserted into surface material 12 from opening 15 shown in FIG. 5(b). Because headrest stay 13 and impact-absorbing member 18 are integrally assembled via seal 17 before being inserted, assembling them together inside surface material 12 is unnecessary.

After headrest stay 13 and impact-absorbing member 18 are inserted into surface material 12, the circumferential portion of opening 15 of surface material 12 is inserted into seal 17. The circumferential portion of opening 15 shown in FIG. 5(b) is inserted through gap 20 between inner plate 21a and outer plate 21b (see FIG. 3(c)). Because the length T of gap 20 between inner plate 21a and outer plate 21b is set to be nearly the same as the thickness of surface material 12 or to be slightly less, the circumferential portion of opening 15 of surface material 12 is inserted through gap 20 without any gaps. Therefore, leakage of the injected foaming material can be prevented.

After the insertion of the circumferential portion of opening 15 of surface material 12 through gap 20 of seal 17, the foaming material is injected by inserting the injection nozzle (not shown) through injection hole 25, which is provided at seal 17. Then, the foaming material is foamed inside surface material 12.

The foaming material injected into surface material 12 forms foamed body 19 by foaming and curing, and the outer contour of headrest 11 is formed.

As shown in FIG. 3 and FIG. 4, injected foaming material flows into gap 20 through window part 37 formed in inner plate 21a of seal 17. The foaming material impregnates and permeates into the sponge-like backing material of surface material 12 of the circumferential portion of opening 15, which is inserted through gap 20. Then, by the subsequent curing reaction of the foaming material, surface material 12 of the circumferential portion of opening 15 is firmly connected to seal 17. Therefore, opening 15 never opens and foamed body 19 never leaks out.

Thus, in the headrest of this embodiment, headrest stay 13 is inserted into seal 17, and impact-absorbing member 18 is connected to seal 17. In this state, those parts can be inserted into surface material 12 through opening 15. Assembling them inside surface material 12 is unnecessary, and the manufacturing process can thus be facilitated and simplified. Furthermore, because headrest stay 13 is inserted through opening 15, and the circumferential portion of opening 15 is inserted through gap 20 of seal 17, leakage of the foaming material from opening 15 can be prevented at the time of injecting it.

Also, because the circumferential portion of opening 15 of surface material 12 is inserted through gap 20 of seal 17, the tensile force does not work on the circumferential portion of opening 15 when the injected foaming material expands and fills surface material 12. Therefore, wrinkles are not generated on surface material 12, and the foamed body is formed without impairing the appearance of headrest 11.

In addition, as shown in FIG. 1 and FIG. 2, one end part, namely, the lower end part of impact-absorbing member 18, is connected to seal 17 by connecting ribs 27 (27a, 27b). The other end part, namely, the upper end part of back surface 18b, is in contact with connecting part 13b of the headrest 13. Therefore, the backward impact load at the time of a rear collision is dispersed to leg parts 13a, which are inserted into seal 17, and connecting part 13b. The moment load is reduced, so the amount of deformation of the headrest frame can be reduced, and deformation of the cervical vertebrae of the occupant, which can cause whiplash, can be minimized.

Impact-absorbing member 18 has rectangular facing surface 18a for absorbing the impact to the head and neck of the occupant. But facing surface 18a is not limited to a plane surface; it may have a curved surface adapted to a curve from the occiput to the neck. Thus, the deformation of the head and neck of the occupant can be further diminished.

(The Second Embodiment)

Figure 6A:
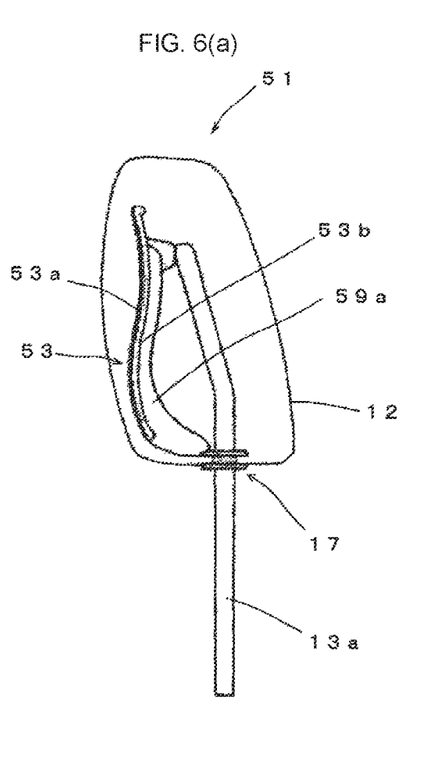
FIG. 6(a) is a longitudinal section view of the center part of the headrest.
Figures 6B, 6C:
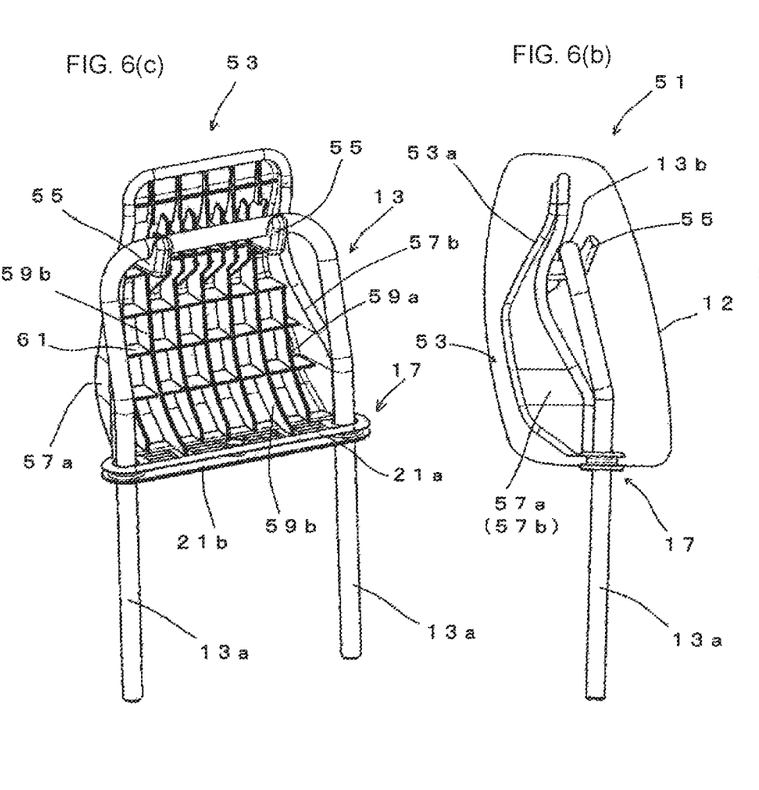
FIG. 6(b) is a side view of the headrest.
FIG. 6(c) is a rear perspective view of a seal with a headrest stay inserted and the impact-absorbing member.
Figure 7A:
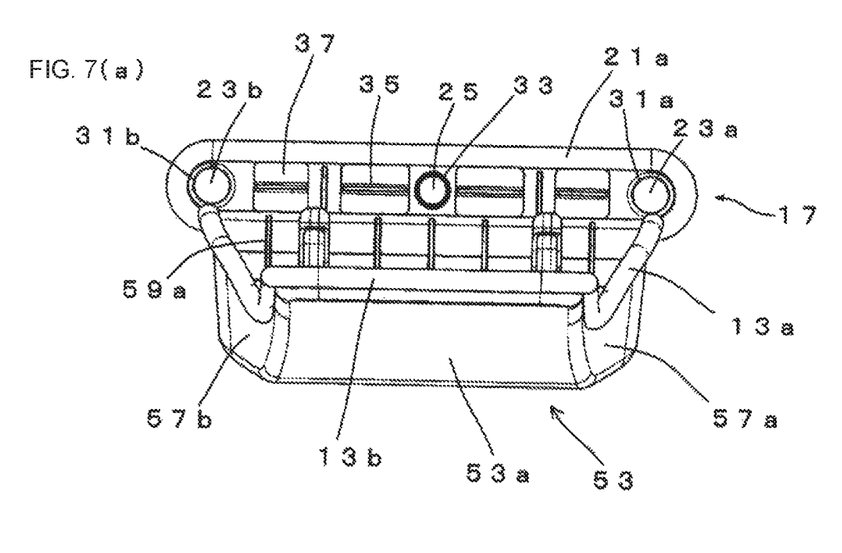
FIG. 7(a) is a plan view of the seal into which the headrest stay used in the second embodiment of the headrest according to the present invention is inserted and the impact-absorbing member.
Figure 7B:
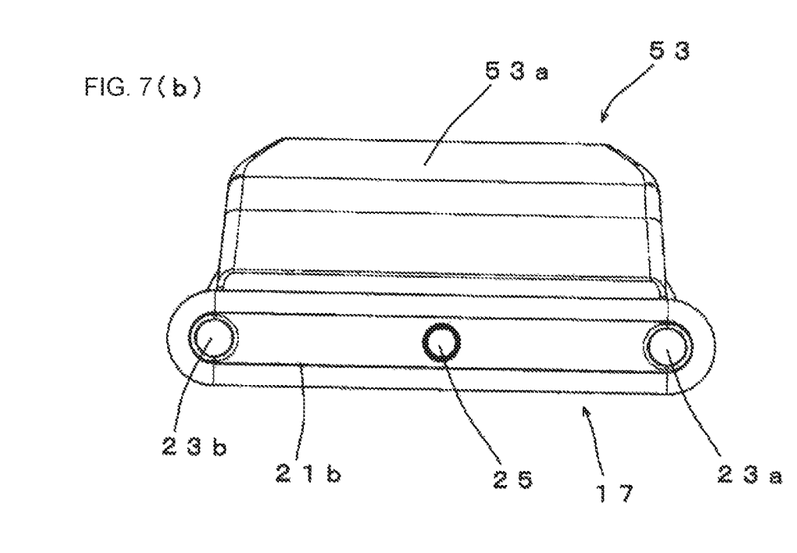
FIG. 7(b) is a bottom plan view.

The following describes the second embodiment of the present invention with reference to FIG. 6 and FIG. 7.

The difference between the first embodiment and second embodiment is in the shape and structure of the impact-absorbing member. The seal, the headrest stay, the surface material and the foamed body have the same shape and structure as in the first embodiment. Therefore, parts with the same shape and structure as in the first embodiment are indicated with the same names and signs, and the description is mainly of parts that differ from those in the first embodiment.

The following describes the second embodiment of the present invention with reference to FIG. 6 and FIG. 7. FIG. 6(a) is a longitudinal section view of the center of the headrest of the second embodiment. FIG. 6(b) is a side view of the headrest. As shown in FIG. 6(a) and FIG. 6(b), headrest 51 comprises surface material 12 forming the outer contour of headrest Si; an inverse-U-shaped headrest stay 13 having a pair of leg parts 13a (see FIG. 6(c)); seal 17 sealing opening 15 (see FIG. 5(b)), positioned at the bottom of headrest 51 formed in surface material 12; impact-absorbing member 53, the tip of one end of which is connected to seal 17; and foamed body 19 formed in headrest 51.

Impact-absorbing member 53 is a plate-like member opposed to the occupant of the seat (not shown). Also, impact-absorbing member 53 comprises facing surface 53a and back surface 53b. Facing surface 53a is a curved surface adapted to the outer curve of the head and neck of the occupant. Back surface 53b is a curved surface on the opposite side of facing surface 53a. The lower end of back surface 53b is connected to seal 17. A pair of claw parts 55 is provided at the upper side of back surface 53b. The claw parts 55 are engaged with connecting part 13b of headrest stay 13.

As mentioned above, facing surface 53a is a curved surface adapted to the outer curve of the head and neck of the occupant. The upper part is recessed toward the rear, and the lower part bulges toward the front, which is the occupant's side (see FIG. 6(a), FIG. 6(b) and FIG. 7). The impact to the head and neck of the occupant can be absorbed by the whole facing surface.

As shown in FIG. 6(c), back surface 53b, which is the opposite side of facing surface 53a, has the same curve as facing surface 53a. The side frame parts of the plate-like members 57a and 57b are formed at the right and left ends. Side frame parts 57a and 57b elongate toward the rear. Also, the lower parts of side frame parts 57a and 57b are in contact with leg parts 13a of headrest stay 13, and leg part 13a is inserted into seal 17.

A pair of claw parts 55 is provided at the upper side of back face 53b. Each claw is comprised of an L-shaped member whose upper side is open, and each claw is formed integrally as a part of impact-absorbing member 53. The open structure of the upper part of each claw part 55 means that, when headrest stay 13 is inserted into seal 17, it is easy to engage claw parts 55 with connecting part 13b of headrest stay 13. And also, it becomes possible to make accurate alignment with headrest stay 13.

A plurality of primary vertical reinforcing ribs 59a and a plurality of secondary vertical reinforcing ribs 59b are provided at the back face 53b for reinforcing the seal. The ribs are partition plates, and they are provided in the vertical direction.

Secondary ribs 59b are larger than primary ribs 59a. Furthermore, horizontal reinforcing ribs 61 are provided, and they are horizontal partition plates. They are provided so as to cross reinforcing ribs 59a and 59b.

The following describes the method of producing the headrest of the second embodiment, focusing on the parts that are different from those in the first embodiment.

The method of producing headrest 51 of the present invention comprises a step of inserting the pair of legs 13a of headrest stay 13 through insertion holes 23a and 23b provided in seal 17; a step of engaging claw parts 55 of impact-absorbing member 53 with connecting part 13b of headrest stay 13; a step of assembling impact-absorbing member 53, seal 17 and headrest stay 13; a step of inserting headrest stay 13 and impact-absorbing member 53 into surface material 12 from opening 15 of surface material 12; a step of inserting the circumferential portion of opening 15 into seal 17; a step of injecting the foaming material which forms foamed body 19 into surface material 12 from injection hole 25 provided at seal 17 and foaming it; and a step of forming foamed body 19 by curing the foaming material injected in surface material 12.

Headrest stay 13 inserted in seal 17 and impact-absorbing member 53 are inserted into surface material 12 through opening 15 shown in FIG. 5(b). Because headrest stay 13 and impact-absorbing member 53 are integrally assembled via seal 17 before being inserted, assembling them in surface material 12 is unnecessary. These points are the same as in the first embodiment. In this case, because facing surface 53a is a curved surface, impact-absorbing member 53 has a thickness larger than that of impact-absorbing member 18 of the first embodiment. Opening 15 and seal 17 are formed at a prescribed size so as to be insertable into surface material 12.

The step of inserting the circumferential portion of opening 15 of surface material 12 into the gap of seal 17, the step of injecting the foaming material into surface material 12 from injection hole 25 of seal 17 and foaming it, and the step of forming foamed body 19 by curing the foaming material injected into surface material 12 are the same as in the first embodiment.

Also, injected foaming material flows into gap 20 through window part 37, and the foaming material impregnates and permeates into the sponge-like backing material of surface material 12 of the circumferential portion of opening 15, which is inserted into gap 20. Then, by the subsequent curing reaction of the foaming material, surface material 12 of the circumferential portion of opening 15 is firmly connected to seal 17. These points are the same as in the first embodiment.

In this embodiment, because facing surface 53a of impact-absorbing member 53 is a curved surface adapted to the outer curve of the head and neck of the occupant, an impact to the head and neck can be absorbed thoroughly by facing surface 53a. Also, by providing reinforcing ribs 59 at back surface 53b of impact-absorbing member 53 enhances the strength of impact-absorbing member 53.

Furthermore, because impact-absorbing member 53 is easily engaged with headrest stay 13 via claw parts 55 provided at the back of impact-absorbing member 53, the assembly is easy. In addition, impact-absorbing member 53 is engaged with headrest stay 13 via claw parts 55. Impact-absorbing member 53 and headrest stay 13 come into contact with side frame parts 57a and 57b. Leg parts 13a of headrest stay 13 is inserted into seal 17 connected to impact-absorbing member 53. Because of these structures, when an impact is applied to impact-absorbing member 53 from the head and neck of the occupant, the impact is dispersed and the moment load is reduced. Consequently, the amount of deformation of the headrest frame can be reduced, and the deformation of the cervical vertebrae of the occupant, which can cause whiplash, can be minimized.

REFERENCE NUMERALS 11 headrest
12 surface material
13 headrest stay
13a pair of legs of headrest stay
13b connecting part of headrest stay
15 opening
17 seal
18 impact-absorbing member
19 foamed body
20 gap 21a inner plate
21b outer plate
23a, 23b insertion hole
25 injection hole
51 headrest
53 impact-absorbing member
55 claw part

The invention claimed is:

1. A headrest for a vehicle seat comprising:
a surface material forming an outer contour;
a headrest stay inserted into said headrest;
a seal sealing an opening formed at the bottom of the surface material of said headrest;
a plate-like impact-absorbing member one end of which is connected to said seal and which is provided in the headrest;
a foamed body formed in said headrest, the foamed body being made of cured foaming material; wherein a circumferential portion of the opening of said surface material is inserted in said seal, the circumferential portion being impregnated with the foaming material before being cured to thereby form a connection between the surface material and the seal when the foam is cured; and wherein said seal, said impact-absorbing member and said headrest stay are integrally assembled.

2. A headrest of claim 1 wherein said facing surface is formed in a curved shape adapted to the shape of the head and neck of the occupant.

3. A headrest of claim 1 wherein a claw part engaged with said headrest stay is provided at one end of said impact-absorbing member, and said headrest stay is engaged with said claw part by the insertion of a pair of legs in insertion holes provided in said seal.

4. A headrest of claim 1 wherein said impact-absorbing member has a part coming into contact with the pair of legs of said headrest stay.

5. A headrest of claim 3 wherein said seal comprises a pair of plate members joined together with a prescribed gap around them, an insertion part having said insertion holes provided in the pair of plate members, and an injection part having an injection hole, and wherein a window part communicating with said gap is formed in one plate member of said pair of plate members, and a circumferential portion of the opening of said surface material is inserted into said gap.

6. A headrest of claim 2 wherein said impact-absorbing member has a part coming into contact with the pair of legs of said headrest stay.

7. A headrest of claim 3 wherein said impact-absorbing member has a part coming into contact with the pair of legs of said headrest stay.

* * * * *